United States Patent [19]

Seeley

[11] Patent Number: 5,756,135
[45] Date of Patent: May 26, 1998

[54] WATER INSOLUBLE YEAST SOLIDS PRODUCT AND PROCESS OF MAKING SAME

[75] Inventor: Robert D. Seeley, Bosque County, Tex.

[73] Assignee: Robert D. Seeley Trust, Clifton, Tex.

[21] Appl. No.: 638,974

[22] Filed: Apr. 25, 1996

Related U.S. Application Data

[63] Continuation-in-part of Ser. No. 306,602, Sep. 15, 1994, abandoned.

[51] Int. Cl.$^6$ .................................................. A23L 1/28
[52] U.S. Cl. ........................... 426/60; 426/61; 426/62; 426/656; 435/254.2; 435/255.1; 530/371
[58] Field of Search ................... 426/60, 61, 62, 426/519, 656; 435/254.2, 255.1; 530/371, 395, 821, 824

[56] References Cited

U.S. PATENT DOCUMENTS

| | | |
|---|---|---|
| 3,867,255 | 2/1975 | Newell et al. . |
| 3,867,554 | 2/1975 | Sucher et al. . |
| 3,867,555 | 2/1975 | Newell et al. . |
| 3,887,431 | 6/1975 | Robbins et al. . |
| 3,888,839 | 6/1975 | Newell et al. . |
| 3,914,450 | 10/1975 | Robbins et al. . |
| 3,991,215 | 11/1976 | Robbins . |
| 4,007,088 | 2/1977 | Fencl et al. . |
| 4,122,196 | 10/1978 | Robbins et al. . |
| 4,135,000 | 1/1979 | Schuldt, Jr. . |
| 4,251,519 | 2/1981 | Robbins et al. . |
| 4,734,287 | 3/1988 | Singer et al. . |

OTHER PUBLICATIONS

Beran, Advances in Microbial Physiology, 1968, 2:143–170 "Budding of Yeast Cells, Their Scars and Ageing".
Moore et al, Enzyme Microb. Technol. 1990, vol. 12, Oct., pp. 764–770 "Distruption of Baker's Yeast In a High-Pressure Homogenizer:New Evidence On Mechanism".
Smith et al, Journal of Bacteriology, May 1977, pp. 818–825"Two Pools of Glycogen in Saccharomyces".
Fleet, Microbial Cell Wall Synthesis and Autolysis, 1984, pp. 227–238 "The Occurrence And Function Of Endogenous Wall–Degrading Enzymes In Yeast".
Prepared Foods, Dec. 1992, pp. 21–31, "Fat substitutes: Finding method in the madness".
Fleet, The Yeasts, vol. 4, 2ed., pp. 245–257.

*Primary Examiner*—Leslie Wong
*Attorney, Agent, or Firm*—Polster, Lieder, Woodruff & Lucchesi, L.C.

[57] ABSTRACT

A micron yeast which can be used as a fat substitute. The product comprises fragmented water insoluble yeast solids, which fragments primarily are less than 3 microns in size, less than about 5% whole cells, less than about 10% ghost cells, 55–80% crude protein and substantially the same percentage of nucleic acid as was present in the starting yeast. The insoluble yeast solids are fragmented in one pass at 12,000–23,000 psi through a microfluidizer and can be recovered as a yeast paste which forms a minimum viscosity of 20,000 centipoise at 10% solids in an aqueous suspension. The solubles are recovered as yeast extract. The process includes an incubation or conditioning of the fragmented slurry of 60–120 minutes at 45°–55° C. and pH 5.5–7.0 followed by heating the slurry to 70°–80° C.

16 Claims, No Drawings

WATER INSOLUBLE YEAST SOLIDS PRODUCT AND PROCESS OF MAKING SAME

RELATED APPLICATIONS

This application is a continuation-in-part of prior application Ser. No. 08/306,602, filed Sept. 15, 1994, now abandoned.

BACKGROUND OF THE INVENTION

In the early 1970's applicant was a Research Director at Anheuser-Busch Incorporated, and supervised and worked on a project to make usable products from bakers yeast. All of this work resulted in numerous patents and led to the conclusion that three different products had to be produced if a yeast biomass was to be commercially marketed as anything but whole bakers yeast or active dry yeast.

These three products were:

1. Isolated yeast protein with cell walls removed. This product could have the nucleic acid intact or removed.
2. Yeast extract with cell walls removed and most of the protein removed. This fraction usually contains the nucleic acid.
3. A fragmented cell wall fraction (yeast glycan). This fraction has thickening and fatty mouth-feel properties and contains little protein and little nucleic acid.

The present invention is directed to a new and improved process for making the third fraction, in which the entire insolubles portion of the yeast biomass, including the protein and nucleic acid, is utilized to make the glycan, thus eliminating the need to make and sell isolated yeast protein. The solubles portion of the starting yeast biomass is recovered as yeast extract. The problems with the prior processes for making glycan is that in these processes the glycan fraction constitutes only 20% of the beginning biomass and the other two fractions (containing 80% of the beginning biomass) could not be commercially marketed. Thus, it was not economically feasible to make only the glycan fraction because only 20% of the starting material was utilized.

The present invention uses the insolubles portion of the entire yeast biomass in making a product which has thickening properties and fatty mouth-feel. The present product has 55-80% protein and substantially the same per cent nucleic acid as in the starting yeast. In addition, the solubles portion of the yeast biomass is recovered as yeast extract.

In 1975 U.S. Pat. No. 3,867,554 issued to Sucher, Robbins, Sidoti, Schuldt and Seeley and described a process to produce from bakers yeast a cell wall fraction from ruptured yeast cells called bakers yeast glycan. This yeast product had unique properties of water absorption and aqueous suspensions had a fat-like mouth-feel. The yeast glycan was produced by rupturing yeast cells with high pressure homogenizers and recovering the insoluble irregular cell wall fragments from the soluble yeast fractions. The soluble yeast fractions were comprised of yeast proteins and other solubles in the yeast cell. The yeast glycan of Sucher et al had most of the protein and nucleic acid removed. It contained only 5-20% crude protein and 0.1-3% nucleic acid.

The yeast protein itself was recovered as bakers yeast protein (U. S. Pat. Nos. 3,887,431, 3,867,255, 3,867,555 and 3,888,839). The remaining yeast solubles were recovered as bakers yeast extract (U.S. Pat. No. 3,914,450).

A later patent, Robbins et al U.S. Pat. No. 4,122,196 showed a method of making yeast glycan which contained 5-20% protein and 1-3% nucleic acid. In the Robbins et al process, the major portions of the protein and the nucleic acid are removed from the starting yeast.

The bakers yeast glycan as recovered by the process of Sucher et al U.S. Pat. No. 3,867,554 had a crude protein of from 5-20% with a nucleic acid content of 0.1-3.0%. A 10% aqueous suspension of spray dried material had a minimum viscosity of 500 centiposes.

The functional value of yeast glycan as a fat-replacement in various food systems, especially for replacing fat in salad dressing, sour cream dips and imitation ice creams was well demonstrated. Food processors found yeast glycan to be an ideal ingredient to replace fats and oils in low calorie food products. Bakers yeast glycan has been approved by the FDA (1986 c Bakers Yeast Glycan. Code of Federal Regulations Title 21, 172.898 April ed., Food and Drug Administration, Washington, D.C.).

No commercial production of bakers yeast glycan followed these discoveries even though the superior functional value as a fat-replacement in food systems had been demonstrated. The reasons for the non-commercialization of the process were (1) the cell rupture step required a minimum of 3 passes through a high pressure (10,000 psi) homogenizer to achieve satisfactory cell rupture and (2) the yield of glycan from the yeast solids processed was only about 20%. Thus, the raw material cost for glycan was five (5) times the cost of bakers yeast solids, from which the glycan was isolated.

Further, the economy of the process depended upon the marketing of bakers yeast protein and bakers yeast extract which comprised the other 80% of the bakers yeast solids in the process. The food applications of bakers yeast protein and bakers yeast extract were not as outstanding and unique as bakers yeast glycan.

A plant to make bakers yeast glycan from bakers yeast solids would be capital intense as the bakers yeast protein and extract would have to be recovered and marketed to offset the raw material cost of glycan, if glycan was the only yeast product recovered. A major problem was the crucial costly rehomogenization steps with maintenance-heavy high pressure homogenizers.

I have discovered that processing bakers yeast cells through a bead mill with sufficient energy and using zirconium beads of approximately 0.8–1.0 mm. in diameter produces a yeast slurry containing a mixture of insoluble yeast fragments of sizes of approximately 1–5 microns, fragments less than one micron, ghost cells, and the soluble solids of the yeast cells. The mixture has a creamy mouth-feel. Heating the milled yeast slurry to pasteurization temperatures of 70°–80° C. denatures the soluble yeast proteins resulting in a mixture of insoluble yeast cell wall fragments and insoluble yeast protein, which can be readily separated from the remaining yeast solubles by centrifugation. The insoluble mixture of cell wall fragments and yeast protein recovered by centrifugation as a paste is 56–80%, preferably 65–80% of the initial yeast solids. The paste is called micron yeast. The remaining 20–44%, preferably 20–35%, of the initial yeast solids are recovered as yeast solubles and are called yeast extract.

The bead mill process is described in Example No. 1.

EXAMPLE NO. 1

A method of fragmenting yeast cells using a bead mill was in an "Eiger Mini 100", a bead mill manufactured by Eiger Machinery Inc., 1258 Allanson Road, Mundelein, Ill. 60060. The bead mill uses approximately one (1) mm. zirconium silicate beads. The 100 ml. milling chamber was filled with 80 ml. of beads. The yeast slurries of 10–15% fresh bakers yeast solids were recycled to obtain maximum fragmentation. Water was circulated around the milling chamber to control the milling temperatures of the yeast slurry. In most cases the volume of bakers yeast slurry milled was approximately 70–110 ml. The concentration of yeast solids was 10–15%. Mill rates were from 4000–5000 RPM. Lower milling rates could be used and larger volumes charged to the mill, but these conditions slowed the rate of fragmentation. Samples of milled yeast were examined microscopically to determine the degree of fragmentation.

The data in Table I shows that milling a 10% solids slurry of bakers yeast for up to 15 minutes resulted in fragmentation of all cells. After 5 minutes there were very few unstained cells. The fragments were from less than 1 micron to 5 microns in length. The whole milled slurry was foamy. The slurry had a mouth-feel like heavy cream. A 10% solids slurry of live bakers yeast solids does not have a creamy mouth-feel. The creamy mouth-feel results from the insoluble cell fragments produced under the milling conditions.

TABLE I

Seventy (70) ml. aliquots of 10% solids slurry of commercial bakers cake yeast at 70% moisture was milled in an Eiger Machinery bead mill (Model Mini 100) for 15 minutes at 4000 RPM at ambient pH. Samples were examined microscopically.

| Time of Milling | Microscopic |
| --- | --- |
| 0 minutes | All cells intact and unstained |
| 5 minutes | Approximately 90% of cells fragmented. Few unstained cells. |
| 10 minutes | All cells fragmented |
| 15 minutes | Same as in 10 minutes. |

The whole slurry was foamy and had a mouth-feel like heavy cream.

Milled samples of bakers yeast were examined microscopically in an improved Neubauer Bright Line Haemocytometer from Hausser Scientific Co. to determine the rate of cell fragmentation. A sample of diluted yeast slurry was placed in a 0.1 mm. deep chamber and the cells counted in 5 squares. The volume of slurry in the 5 squares times the degree of dilution equals the volume of 1 ml. of slurry. A sample of unmilled yeast slurry is counted to determine the live cell count before milling. Milled samples are examined and the per cent of live cells and ghost cells calculated.

The results of two milling studies are recorded in Table II. I discovered that after 3 minutes approximately 85% of the whole cells were fragmented, but that between 3 minutes and 10 minutes, the percent of ghost cells were in the 40–60% range. Ghost cells are whole cells from which the cytoplasm has essentially leaked out of the cell. The ghost cells are about 5 microns long and 3 microns in width. The non-ghost cell fragments were less than 4 microns and the majority were 1 micron or less. The apparent rise and fall in ghost cell percentage recorded is due to an estimated error of 5% in cell counting.

The reason for the relatively constant percent of ghost cells is not known.

TABLE II

Cell Counts of Milled Yeast Slurries

Eiger Mini Mill 100 - 1.0 mm. Zirconium Silicate Beads

| | |
| --- | --- |
| Charge to Mill | 110 ml. |
| Slurry Solids | 15% |
| Slurry Temp to Mill | 6° C. |
| RPM | 4000 |
| Cooling Water | 29° C. |

| Milling Study | Milling Time Minutes | Temp. End Milling Period | Live Cell Count - % | Ghost Cell Count - % |
| --- | --- | --- | --- | --- |
| #MS-28 | 0 | — | 100 | 0 |
| | 1 | 30° C. | 54 | 33 |
| | 2 | 35° C. | 32 | 48 |
| | 3 | 38° C. | 12 | 60 |
| | 4 | 41° C. | 10 | 62 |
| | 5 | 44° C. | 7 | 61 |
| #MS-31 | 0 | — | 100 | 0 |
| | 3 | 36° C. | 16 | 45 |
| | 5 | 42° C. | 8 | 48 |
| | 6 | 45° C. | 8 | 57 |
| | 7 | 47° C. | 7 | 59 |
| | 8 | 49° C. | 3 | 47 |
| | 10 | 52° C. | 1 | 50 |

Bakers yeast grows by budding. As a bud forms and breaks off from a mother cell, a bud scar forms. Mother cells can have up to 14 or more bud scars. The area of the bud scar may be more difficult to fragment.

Under milling conditions, cells with zero or a few bud scars may fragment into small, linear fragments of 5 to less than 1 micron more readily than yeast cells with larger numbers of bud scars. Commercial bakers yeast grows exponentially so that at any time in the growth cycle 50% of the cells will have a lower number of bud scars than the remaining cells. The yeast cells with the least bud scars may be the cells which fragment relatively easily compared to cells with many bud scars. The milling conditions probably force the cell contents out of the yeast cell without breaking up the cell wall, leaving an empty cell envelope of a ghost cell.

Fragmentation of yeast by any method of physical attrition results in insoluble cell fragments of varying micron size and soluble cell solids. Centrifugation is the usual method of separating the yeast solubles. The data in Table III shows that milling a yeast to approximately 90% cell fragments results in a milled yeast slurry which did not pack on centrifugation in a clinical centrifuge.

TABLE III

Seventy (70) ml. aliquots of a 10% solids slurry of bakers cake yeast were milled in an Eiger bead mill with 0.8–1.0 mm. zirconium silicate beads at 4000 RPM for 0–5 minutes. Samples were examined microscopically and centrifuged 3 minutes in a clinical centrifuge.

| Milling Time | Microscopic | Insolubles After Centrifugation |
| --- | --- | --- |
| 0 Minutes | Typical Yeast Cells | Packed Well |
| 1 Minute | Most Cells Intact | Packed Well |
| 2 Minutes | 70% Cells Fragmented | Packed Poorly |
| 3 Minutes | 90% Cells Fragmented | Packed Poorly |
| 4 Minutes | 90% Cells Fragmented | Packed Poorly |
| 5 Minutes | 90% Cells Fragmented | Packed Poorly |

Separation and washing of the insoluble yeast solids from the yeast solids of milled yeast is difficult. The yeast solubles have a yeasty flavor. The insolubles have a desired creamy mouth-feel. In most food applications for fragmented yeast cells as a fat-replacement, the fragmented yeast insolubles should be essentially bland without yeasty flavor notes.

I have discovered that if the milled yeast slurries are heated to approximately 70° C., the resulting yeast slurry can be readily separated into a clear supernatant of yeast solubles and an insoluble yeast paste. The centrifugation of milled yeast heat-treated slurries in a laboratory clinical centrifuge resulted in separation of the insolubles to form a paste in the bottom of the centrifuge tube. The clear solubles (extract) could be poured off and the centrifuge tube inverted with no flow of the paste.

The reason for this increase in sedimentation rate of the yeast insolubles is not known. Most probably, the heat-treatment to pasteurization temperatures results in denaturation of soluble yeast protein. A matrix of insoluble protein and insoluble cell fragments increases the density of the insolubles.

Example No. 2 shows the result of heat-treating a milled yeast slurry.

EXAMPLE NO. 2

Preparation of Micron Yeast From Commercial Bakers Cake Yeasts—Saccharomyces Cerevisiae (MS-13)

Six hundred and sixty-seven (667) grams of 70% moisture bakers yeast (cake) was diluted to 2000 ml. to make a 10% solids slurry. Nine 100 ml. batches were milled in an Eiger Machinery bead mill (Model Mini 100) using 0.8–1.0 mm. zirconium silicate beads for 5 minutes. Final temperatures after milling were 42°–46° C. The milled yeast slurry was very foamy. The slurries were combined and centrifuged in 750 ml. plastic bottles in an IEC Centra 7® centrifuge at 2,500 RPM for 3 minutes to break the foam. A 240 ml. aliquot of the defoamed milled yeast was heated to 70° C. and centrifuged. After the first centrifugation, the slurry contained 53% supernatant and 47% packed yeast insolubles. The packed solids (paste) did not flow from the centrifuge tubes on decantation. The washed, packed fragmented yeast paste had a solids of 8.8%. The paste was creamy in taste and equivalent to heavy cream with some yeasty flavor.

The milling and heat-treatment can be combined into one step by limiting the cooling of the milling chamber as shown in Example No. 3. The final yeast slurry temperatures after milling were approximately 70° C. The milled slurry centrifuged into supernatant and packed insolubles in a clinical centrifuge. The washed paste had the desired creamy fat-like mouth-feel with no bitter taste.

EXAMPLE NO. 3

The Milling of Yeast Slurries at Elevated Temperatures

Three 70 ml. aliquots of a 10% solids fresh bakers yeast were milled for periods of 5, 8 and 6 minutes in a Eiger Mini 100 Mill at 4000 RPM without cooling water to the mill. The final temperatures of the milled yeast slurries were 70° C., 68° C. and 70° C. All cells were fragmented and dispersed, not in clumps. The milled slurry was very foamy resulting from entrapment of air as the slurry was recycled in the mill. Milled yeast thickens when heated to temperatures of 70° C. or more.

The milled yeast slurry was centrifuged in 50 ml. centrifuge tubes in a clinical centrifuge at maximum setting (#7).

The insoluble solids compacted satisfactorily and were given 2 water washes.

The recovered washed yeast cell fragments reslurried in a minimum amount of water to a paste containing 8.1% solids. The paste tasted creamy with no bitters, some astringency, and earthy flavor notes.

Glycan made according to U.S. Pat. No. 3,867,554 had a very low protein content. The intense fatty mouth-feel of the high protein pastes of this process most probably results from the greater degree of fragmentation of the yeast cell walls to micron sizes of 1–2 microns or less which increases fatty mouth-feel. Further, the mixture of insoluble yeast protein and cell wall fragments form a matrix which improves the fatty mouth-feel of this mixture of cell wall fragments. This yeast product is called micron yeast.

Sufficient micron yeast paste was prepared for spray drying as described in Example No. 4. An analysis of the micron yeast powder is recorded below.

| MICRON YEAST POWDER | |
|---|---|
| Moisture | 6.8% |
| Crude Protein | 53.1% dsb. |
| Nucleic Acid | 3.4% dsb. |
| Fat | 9.4% dsb. |
| Crude Fiber | 1.9% dsb. |
| Ash | 4.1% dsb. |
| Carbohydrate | 31.4% dsb. |

EXAMPLE NO. 4

Preparation Of Spray Dried Micron Yeast

On successive days, 15% solids slurries of fresh bakers yeast of 1760 ml. 7000 ml. and 7000 ml., respectively, were prepared for milling using the following milling conditions:

Eiger Model Mini 100 bead mill

Zirconium silicate beads of approximately 0.8–1.0 mm.

Milling temperatures of 40°–50° C.

Cooling water temperatures of 1°–6° C.

Charge to mill of 80 ml.

Milling time of 5 minutes

After each milling period of 5 minutes, the milled yeast slurry was chilled to 5° C. Cell counts were made in a counting chamber. After 5 minutes the percent regular cells was 5% of cells counted before milling. The ghost cells were 48 %.

The foamy milled yeast slurries were defoamed by centrifuging in 750 ml. bottles in an IEC Centra 7® Model centrifuge at low speed. The defoamed milled yeast slurries were diluted to 10% solids before heating. The slurries were heated in a 80°–95° C. water bath to 70° C. The heat-treated milled slurries were cooled to 5° C. before centrifugation to recover the yeast paste.

All the water-washed yeast pastes were combined. The total pastes were 13.4 lbs @ 14.2% solids or 1.9 lbs of cell solids. Sufficient water was added to make 2½ gallons of slurry. The slurry was spray dried in a Nichols pilot spray dryer.

The bead milling process to produce micron yeast requires a 3–5 minute hold time in the mill to obtain 90% fragmentation of the yeast cells. After 10 minute milling approximately 50% of the starting yeast cells remained as ghost cells of 3 to 5 microns in the size. The production of cell fragments of 1–2 microns or less is the key to producing a micron yeast with a maximal fatty mouth-feel in aqueous suspension. Fragmenting the ghost cells to 1–2 microns or less in size would intensify the creamy mouth-feel of micron yeast. Eliminating hold time in the milling step would make the process more commercially feasible.

I have discovered that a microfluidizer manufactured by the Microfluidics Corporation of Newton, Mass. will fragment approximately 90–95% of bakers yeast cells in one pass at pressures of 12,000–22,000 psi, resulting in less than about 10% ghost cells and a majority of fragments of 2–3 microns or smaller. A micron yeast paste can be recovered which has a high degree of water absorption and having a creamy, fat like mouth-feel. In the process a brothy, savory yeast extract (yeast solubles) also can be recovered.

DETAILED DESCRIPTION OF PREFERRED PROCESS

My preferred process is comprised of the following steps: production of yeast cells, fragmentation of the yeast cells with a microfluidizer, incubation of the fragmented yeast cells and yeast cell contents for 1–2 hours at temperatures of approximately 50° C. and pH 6.0, heating the fragmented yeast cell slurry to 70°–80° C., recovering the yeast insolubles from the yeast solubles by centrifugation or filtration, and water-washing. The yeast insoluble solids can be recovered in a paste form or reslurried and dried to a powder. The paste or powder is called micron yeast. The yeast solubles from this process can be concentrated to 40–50% solids yeast extract. The concentrated extract can be spray dried. Under conditions where the microfluidized yeast slurries are held for several hours at cold (approximately 5° C.), to ambient temperatures (22°–25° C.) the micron yeast paste can be recovered by centrifugation after heating the microfluidized yeast slurry to 70°–80° C.

DETAILS OF THE PROCESS

The power to operate a microfluidizer comes from a source of compressed air. The M-110Y microfluidizer requires 110 psi air in the amount of 57 CFM to drive the pump in the machine. This microfluidizer will produce pressures of 3,000 to 23,000 psi in the interaction chamber where the combination of cavitation, shear and impact forces fragment yeast cells to particle sizes of 1–2 microns or less. Pressures of 12,000 to 20,000 psi were used to fragment the bakers yeast to make micron yeast.

A 25 HP compressor supplied the necessary power. For optimal operating conditions the compressed air should be dried to prevent moisture freezing at the pump exhaust. If the air is not dry, hot air can be blown on the pump exhaust to prevent freezing. Compressed nitrogen gas can be used as a source of power for short runs.

The critical first step to make micron yeast paste is to maximize yeast cell fragmentation through the microfluidizer. In Example No. 5 a 15% solids slurry of bakers yeast (*Saccharomyces cerevisiae*) was microfluidized. The degree of cell fragmentation was determined microscopically. Data in Table IV demonstrate that after two passes at 200 psi and 18,000 psi essentially all whole cells have been fragmented and only approximately 3–7% ghost cells remain. The major fragments at two passes were under 3 microns (75–86%). Microfluidization at 12,000 psi was less effective at one pass. After 5 passes at 20,000 or 18,000 psi essentially all whole cells and ghost cells were fragmented. More than 90% of the fragments were under 4 microns. It is critical that more than 75% of the yeast fragments be less than 3 microns in size. It also is important that there be less than about 5% whole cells and less than about 10% ghost cells.

EXAMPLE NO. 5

A 15% solids slurry of bakers yeast was microfluidized through a model M-110Y microfluidizer at 20,000, 18,000 and 12,000 psi using compressed nitrogen to power the microfluidizer pump. The slurries were given 7 passes at 20,000 psi and 18,000 psi and 5 passes at 12,000 psi. Samples were taken after each pass for microscopic examination to determine the degree of fragmentation. Results are shown in Table IV.

TABLE IV

One gram samples of the microfluidized cells were diluted to 250 ml. with water, mixed and samples counted microscopically in a Neubauer counting chamber. Whole cells, ghost cells and large cell fragments of 4–5 microns were counted. The percent fragments under 3 microns were estimated from the live cell counts of the yeast slurry fed to the microfluidizer.

CELL COUNTS

| | Percent Whole Cells | Percent Ghost Cells | Percent Fragments 4–5 Microns | Percent Fragments 3 Microns or Less |
|---|---|---|---|---|
| 20,000 psi | | | | |
| 1 Pass | 2 | 3 | 8 | 87 |
| 2 Pass | 2 | 7 | 16 | 75 |
| 3 Pass | 1 | 3 | 16 | 80 |
| 5 Pass | 0 | 0 | 5 | 95 |
| 18,000 psi | | | | |
| 1 Pass | 8 | 12 | 32 | 48 |
| 2 Pass | 1 | 3 | 10 | 86 |
| 5 Pass | 0 | 0.4 | 8 | 92 |
| 12,000 psi | | | | |
| 1 Pass | 11 | 10 | 10 | 69 |
| 2 Pass | 4 | 5 | 13 | 78 |
| 5 Pass | 0 | 2 | 18 | 80 |

The percent fragments under 4 microns was calculated by difference, subtracting the percent whole cells, ghost cells and 4–5 micron fragments from 100 percent whole cells. Accurate counts of fragments below 1–2 microns is difficult with a counting chamber and standard phase microscope.

The viscosities of the microfluidized slurries from Example No. 5 were measured with a Brookfield Viscometer at 25° with a #2 spindle at 30 RPM. The results in Table V show that there was a definite increase in viscosity of the 15% solids microfluidized bakers yeast at all pressures.

TABLE V

| | Viscosity |
|---|---|
| 15% solids yeast slurry - no microfluidizing | 10 centipoise |
| 15% solids yeast slurry - 20,000 psi-7 Passes | 410 centipoise |
| 15% solids yeast slurry - 18,000 psi-7 Passes | 291 centipoise |
| 15% solids yeast slurry - 12,000 psi-5 Passes | 231 centipoise |

The microfluidized yeast slurries of Example No. 5 were centrifuged in a clinical centrifuge for 10 minutes at maximum speed without a separation of insoluble solids from soluble solids. Slurries were light brown in color. An aliquot of the 15% solids microfluidized bakers yeast slurry of Example No. 5 was heated to 70° C. for 5 minutes. The slurry thickened to a consistency of soft whipped cream with the mouth-feel of whipped cream. The slurry was cooled to 25° C. The slurry was too thick to centrifuge. The viscosity averaged 1900 centipoises with spindle #4 at 30 and 60 RPM in a Brookfield Viscometer. The slurry was diluted to 10% solids and with a #2 spindle had an average viscosity of 425 centipoises.

Aliquots of the bakers yeast slurries microfluidized in Example No. 5 were heat-treated at 70° C., centrifuged and given 3 water washes. The results on viscosity are shown in Table VI. The heat treatment step was conducted several hours after holding the microfluidized slurries at ambient temperatures of about 25° C. and overnight at approximately 5° C.

TABLE VI

The viscosity of micron yeast pastes recovered from the microfluidizer of Example No. 5 was measured after heating to 70° C., centrifugation and 3 water washes. The Brookfield viscosities were done with spindle #3 at various speeds and an average viscosity calculated. Measurements were made at 25° C.

| MICRON YEAST PASTE | SOLIDS | VISCOSITY |
|---|---|---|
| 20,000 psi | 6.9% | 1673 centipoise |
| 18,000 psi | 9.9% | 2613 centipoise |
| 12,000 psi | 8.2% | 2233 centipoise |

The pastes of Table VI had a creamy mouth-feel with light yeasty flavor notes. The yeasty flavor is probably from the small amounts of soluble yeast solids remaining in the paste after washing.

The decants from the slurries after centrifugation including washing steps were measured for solids. The loss of yeast solids as soluble solids (yeast extract) from the initial yeast solids microfluidized at 20,000 psi, 18,000 psi and 12,000 psi was 44%, 37% and 23% respectively. The crude protein content was 50%, 46% and 57% for the soluble solids on a dry weight basis.

A sample of yeast paste microfluidized at 18,000 psi, heat-treated and washed as in Table VI was examined microscopically. Results are recorded in Table VII.

TABLE VII 1.5 gm. of paste of 9.9% solids was diluted to 250 ml. and stirred in a waring blender and examined in a Neubauer Counting Chamber. The numbers of fragments per ml. of 10 microns, 6–10 microns, 2–5 microns and less than 2 microns were counted. Using the appropriate factor, the fragments in millions/ml was calculated.

| FRAGMENTS | MILLIONS/ML | % OF FRAGMENTS COUNTED |
|---|---|---|
| 10+ Microns | 0.33 | 3 |
| 6–10 Microns | 0.48 | 4 |
| 2–5 Microns | 2.59 | 14 |
| Less 2 Microns | 8.89 | 79 |

No ghost or whole cells were observed

The pastes reported in Table VI were combined and analyzed. The results are reported in Table VIII. A sample of the 15% solids bakers yeast slurry was analyzed. The crude protein content of 53% is typical of commercial liquid bakers yeast on a dsb. The micron yeast pastes had a higher crude protein than the starting yeast solids and a much lower carbohydrate content.

TABLE VIII

| | Micron Yeast #299, #300, #301 | Bakers Yeast |
|---|---|---|
| Solids | 8.8% | 14.6%* |
| Crude Protein | 68% dsb | 53% dsb |
| Fat | 8% dsb | 7% dsb |
| Crude Fiber | <2% dsb | <1% dsb |
| Ash | 11% dsb | 9% dsb |
| Carbohydrate (by Diff.) | 13% dsb | 32% dsb |

*As a 15% solids bakers yeast slurry.

The results of these microfluidizer runs demonstrate that the microfluidizer is very efficient in producing yeast fragments, the majority of which are under 2 microns. Microfluidized yeast slurries must be heat-treated to 70°–80° C. to recover an insoluble yeast paste by centrifugation.

The viscosities reported for these runs only show that the viscosities of the slurries and pastes increased on microfluidization. A Brookfield Viscometer with a helipath stand is the proper instrument to accurately measure the viscosity of the type of pastes and slurries like micron yeast or glycan. A Brookfield Viscometer with a helipath stand was used to measure glycan viscosities in U.S. Pat. No. 3,867,554. The viscosities of pastes reported in subsequent runs were made with a helipath stand and are viscosities which can be compared to viscosities in U.S. Pat. No. 3,867,554.

The microfluidization of bakers yeast in Example No. 5 was done in 5–7 passes at 20,000, 18,000, 12,000 psi. The repeated microfluidization increased the fragmentation but multiple passes decrease the capacity of microfluidizer in a commercial operation and lengthen processing times. Studies were made to determine if a one pass process could be developed. The studies were made at 18,000 psi. Slurries of 15% bakers yeast solids were found to occasionally plug up the interaction chamber. Slurries of 5 and 10% bakers yeast solids were preferred.

In Table IX are the results of microfluidizing a 10% solids bakers yeast slurry. At 18,000 and 20,000 psi the results were essentially the same, namely, approximately 95% fragmentation of the whole yeast cells with 10% or less ghost cells remaining. At pressures of 12,000 psi fragmentation was only in the 88% range and the "other fragments" were larger. The cell counts were made using the Neubauer counting chamber. Most tests to develop the process for making micron yeast using the microfluidizer were done at 18,000 psi.

TABLE IX

A 10% solids slurry of bakers yeast was microfluidized in a M-110Y microfluidizer in one pass at pressures of 12,000, 18,000 and 20,000 psi. The slurry was at 7° C. before microfluidizing and 40° C. after microfluidizing.
Microscopic Examination Before - yeast slurry 4.8 million cells/2 ml.

| After - | WHOLE CELLS | GHOST CELLS | OTHER FRAGMENTS |
|---|---|---|---|
| 20,000 psi | 5% | 6.5% | 88.5% |
| 18,000 psi | 6.5% | 10% | 83.5% |
| 12,000 psi | 12% | 14% | 74% |

At 12,000 psi "Other Fragments" were larger (2–3 microns) than "other fragments" at 18,000 and 20,000 psi.

A test of microfludizing rates at 5% yeast solids and 10% yeast solids at 18,000 psi showed that at 5% solids the rate was 2.7 liters per hr. At 10% solids the rate was 1.6 liters per hr. On a yeast solids basis, the rate at 5% solids was 84% of the rate at 10% solids.

A run #MS-45 with the microfluidizer is reported in Example No. 6. The data show that the microfluidized yeast does not remain stable at pH 9.5 when held at 3°–4° C. for several hours. The pH drops on standing from pH 9.5 to pH 5.3–6.1. The insoluble yeast fragments and apparently insoluble nucleoproteins form a mix which does not readily separate from yeast solubles by centrifugation. The cell rupture or fragmentation from the microfluidization results in a mix of yeast insolubles at pH 9.5 different from the yeast insolubles which result from the homogenization treatment in U.S. Pat. No. 3,867,554. Incubating the microfluidized yeast slurry of the present process at conditions of pH 6.0 and 50° C. (which are optimal for yeast nuclease activity) did not remove nucleic acids from the yeast nucleoproteins. Nucleic acid analysis of the yeast paste from MS-45 showed a nucleic acid content of 9.3%. This percent nucleic acid is in the range of the nucleic acid content of whole yeast. Data in U.S. Pat. No. 3,887,431 (Robbins, Sucher, Schuldt, Sidoti, Seeley and Newell) reports bakers yeast with a nucleic acid (RNA) of 7.5% dsb.

EXAMPLE NO. 6
Run MS-45

Approximately 28 gallons of a 5% solids bakers yeast slurry were microfluidized over 7.5 hours. The cell counts of the microfluidized bakers yeast slurries were 4% whole cells, 14% ghost cells, and 82% "other fragments". The microfluidized slurry was adjusted to a pH 9.5 and held overnight under cold conditions (2°–4° C.). Examination of the seven pails of the microfluidized yeast slurry after holding showed that they varied in pH from pH 5.3 to pH 6.1. Pails with pH of 5.3 had thick curds. A sample of pH 6.2 slurry was centrifuged in 750 ml. bottles, but the insolubles did not pack. The slurries then were remixed and the pH again raised to 9.5. On centrifugation, no paste formed and there was no clear supernatant.

A 5,000 ml. sample from bucket #7 was heated to 50° C., the pH adjusted to 6.0, stirred for 1.5 hours, and chilled. An aliquot was centrifuged with no further treatment. A second aliquot was heated to 80° C., cooled and centrifuged. A third aliquot was centrifuged after lowering the pH to 4.6 without heat treatment.

All three samples packed well and had clear supernatants on centrifugation, whereas, the microfluidized yeast slurries without incubation at 50° C. pH 6.0 did not centrifuge into a paste and clear supernatant. The pastes had a creamy mouth-feel. The combined pastes had a viscosity of 27,300 centipoises at 10.4% solids using a Brookfield LVT Helipath Stand, Spindle TE at 12 RPM.

The microfluidization of bakers yeast results in unexpected changes in the composition of the fragmented yeast slurries. The nuclease activity is inhibited or destroyed. The nucleoproteins of the yeast, which are normally soluble at pH 6.0 or pH 9.5, are insoluble. The results demonstrate that incubation at 50° C. and pH 6.0 and heat-treatment at 80° C. result in a matrix of insoluble yeast proteins and cell wall fragments which can be separated from yeast solubles by centrifugation into a paste with good water absorption and having a creamy mouth-feel.

A sample of the microfluidized bakers yeast slurry from Run #MS-47 was centrifuged and the supernatant and insoluble layers were examined microscopically before further treatment. The results in Example No. 7 demonstrate that recovery of insoluble yeast solids by centrifugation immediately after microfluidization does not yield a clean separation of insoluble white yeast solids from a clear supernatant of soluble yeast solids. The supernatant contained cell wall particles of less than 3 microns. The brown layers were aggregates of fragments 5–10 microns in length and a bottom layer of live and dead yeast cells which had not been micronized through the microfluidizer.

EXAMPLE NO. 7
Run MS-47

8,000 ml. of 5% solids bakers yeast slurry was microfluidized at 18,000 psi in 15 minutes. A 4,000 ml. aliquot at pH 5.5 was incubated at pH 6.0 at 50° C. Samples were taken at 30, 60, 90 and 120 minutes and centrifuged (50 ml. samples) in a clinical centrifuge. These samples were compared to a 50 ml. centrifuged slurry which had not been incubated.

The centrifuged sample with no incubation showed several bands of solubles and insolubles.

| Murky Supernatant | 50% |
| Murky Tan Precipitate | 30% |
| White Precipitate | 10% (compact) |
| Brown Precipitate | 10% (compact) |

A microscopic examination in a Neubauer counting chamber was made of the insolubles.

| Murky Supernatant | Cell fragments of less than 3 microns - some larger cell fragments |
| Murky, tan Precipitate | Aggregates of cell fragments of 5–10 microns in - length - fine cell fragments of less than 3 microns |
| White Precipitate | Small micron size fragments of less than 2–3 microns |
| Brown Precipitate | Live and dead yeast cells 1/3 dead and 2/3 live (by methylene blue stain) Background of micron size fragments |

Samples centrifuged after 30, 60, 90 and 120 minutes of incubation.

| 30 min. | Murky supernatant Soupy precipitate No brown sediment |
| 60 min. | Murky supernatant Soupy precipitate No brown sediment |
| 90 min. | Light yellow supernatant - clear - 68% Light tan precipitate - compact |
| 120 min. | Precipitate less compact Light yellow supernatant |

The changes during incubation are not completely understood. Enzymatic changes take place after microfluidizing bakers yeast cells. Incubation at 50° C. and pH. 6.0 optimal for yeast nuclease to be active. However, in microfluidized yeast slurries, the nucleases are inactive. Analysis reported in Table XI show that micron yeast solids have nucleic acid contents of 7–9% (dsb.), which is the range of nucleic acid in whole bakers yeast solids. The disappearance of whole yeast cells demonstrates that the yeast proteolytic enzymes are not inhibited by microfluidization. The optimal temperature for autolysis of bakers yeast is in the same range as for the nuclease activity. Proteolytic activity for approximately 90 minutes resulted in a matrix of insoluble yeast cell solids (yeast protein and yeast cell wall fragments), which could be separated by centrifugation from the yeast solubles to produce a white paste and a clear supernatant of yeast extract.

Table X shows that the recovery of insoluble solids (micron yeast) from an aliquot of MS-47 which had been incubated was 64%. The recovery of yeast extract solubles was 36%.

TABLE X 4,000 ml. of MS-47 were incubated and the slurry was centrifuged to recover a paste (micron yeast) and yeast extract. The paste was washed 3 times with water. Solids were determined on the extract and washes.
From 3,600 ml. of incubated slurry at 5% solids, 65 gms. of extract solids were recovered. The yield of insoluble solids (micron yeast) 64%.
The yield of soluble solids (yeast extract) 36%

In Example No. 8 the freshly microfluidized yeast slurry was immediately incubated at 50° C. and pH 6.0 to hasten the conversion of the insoluble yeast solids of the cell walls, the whole yeast cells after microfluidization, and other insolubles into a matrix which is essentially yeast cell wall fragments of micron size and insoluble yeast protein. This matrix can be recovered by centrifugation. The assumed proteolytic enzyme activity which converts a microfluidized yeast slurry into a homogeneous white yeast insolubles recoverable by centrifugation, could possibly occur by holding the micronized yeast slurry for an extended period of time at lower temperatures, as may have occurred with the batches processed in Run MS-45. The incubation step used in MS-48 hastens the process. Incubation conditions of 50° C. and pH 6.0 are well known as optimal conditions for yeast proteolytic activity in the manufacture of autolyzed yeast extracts. Apparently the intense fragmentation of the yeast cells by the microfluidizer accelerated proteolytic activity, resulting in the disappearance of brown precipitates of live and dead yeast cells remaining after microfluidization.

EXAMPLE NO. 8

Run MS-48

10,000 ml. of 10% solids bakers yeast slurry was prepared by diluting 18% solids fresh liquid bakers yeast. The yeast slurry was microfluidized through a M-110Y microfluidizer at 15,000–18,000 psi. The time of microfluidizing was approximately 30 minutes. The temperature of the microfluidized yeast slurry was 27° C. A 50 ml. sample of freshly microfluidized yeast was centrifuged in a clinical centrifuge at maximum speed for 3 minutes. The supernatant was murky. The supernatant volume was 56%. The insoluble solids was 44% of the volume. A top white layer of cell wall fragments and yeast protein was 30 ml. A brown layer at the bottom was 14 ml. The brown layer contained yeast cells and large aggregates of cell wall fragments.

The microfluidized yeast slurry was incubated at 50° C. and a pH of 6.0 for 2 hours. The slurry was heated to 80° C. and centrifuged in 750 ml. bottles in an IEC Centra 7® Centrifuge at 4,000 RPM. After centrifugation, the slurry separated into clear yellow supernatant with a mild chickeny, brothy, mouth-watering, savory flavor. The soluble yeast solids in the supernatant are yeast extract solids. The insoluble solids packed in the bottom of the centrifuge bottles are micron yeast solids.

The insolubles were white and are referred to as yeast pastes. The supernatant could be recovered by decantation. The pastes were given 4 water washes. In each wash an amount of water equal to the decant removed was added to the 750 ml. bottle, mixed and recentrifuged.

A solids balance was made on one 3,000 ml. batch of microfluidized and incubated yeast slurry. The results were as follows:

| 3,000 ml. Yeast Slurry @ 9.94% Solids = 298 gms. |
|---|
| Decant #1 - 1,180 ml. @ 3.9% solids = 46.0 gm. solids |
| Decant #2 - 1,320 ml. @ 2.1% solids = 28.0 gm. solids |
| Decant #3 - 1,420 ml. @ 1.1% solids = 16.0 gm. solids |
| Decant #4 - 1,420 ml. @ 0.6% solids = 8.5 gm. solids |
| Decant #5 - 1,460 ml. @ 0.8% solids = 5.8 gm. solids |
| Total 104.3 gm. soluble yeast solids |

The % soluble yeast extract solids=35%

The % insoluble micron yeast paste solids=65%

One last 3,000 ml. batch of diluted yeast slurry solids was incubated and heated to 80° C. Before heating, 0.3% $CaCl_2$ was added. The centrifuged slurry yielded a more compact paste. The Brookfield viscosity of this paste at 25° C. using a Helipath Stand was 107,640 c.p. @ 11.7 solids.

With conditions optimal for yeast proteolytic enzyme activity, a homogeneous white paste of micron yeast is recoverable by centrifugation. The conditions for obtaining the micron yeast may vary depending on the condition of the live yeast, the degree of microfluidization, and the number of passes through the microfluidizer, but some incubation below 60° C. is needed to recover the micron yeast of this invention. I have found that incubation of freshly microfluidized yeast slurry at approximately 50° C. and pH 6.0 is satisfactory.

The incubation conditions used in this process are optimal for nuclease activity as demonstrated in U.S. Pat. No. 3,877,433 (1975) for homogenized bakers yeast. In Table XI are the nucleic acid content in a variety of micron yeast samples from the microfluidization studies. In pastes or powders, the nucleic acid content of samples without incubation were 7.7% and 7.0% dsb. Incubated samples had nucleic acid contents of 8.2% to 9.3% dsb. The nuclease activity of microfluidized bakers yeast slurries is markedly inhibited or destroyed by the fragmentation step. Proteolytic activity is not inhibited. Fragmentation of the yeast cell by the microfluidizer may destroy sites for nuclease enzyme activity.

TABLE XI

The solids, crude protein and nucleic acid content of various micron yeast samples are recorded below. The nucleic acid content (RNA) was measured by the method described in U.S. PAT. NO. 3,887,433 (1975) of Robbins et al.

| Sample | Treatment | % Solids dsb | % Crude Protein dsb | % RNA dsb |
|---|---|---|---|---|
| MS-44-1 | Paste-microfluidized 18,000 psi - 2 water washes - no incubation | 12.2 | 72.7 | 7.7 |
| MS-47-26 | Paste-microfluidized 18,000 psi - incubation 50° C. @ pH 6.0, heat to 80° C. and washed | 10.1 | 69.3 | 8.2 |
| MS-48-43 | Paste-microfluidized 18,000 psi - incubation 50° C. @ pH 6.0, heat to 80° C. and washed | 12.4 | 73.9 | 8.1 |
| MS-48-34 | Paste-microfluidized 18,000 psi - incubation 50° C. @ pH 6.0, heat to 80° C. and washed | 11.2 | 80.4 | 9.0 |

TABLE XI-continued

The solids, crude protein and nucleic acid content of various micron yeast samples are recorded below. The nucleic acid content (RNA) was measured by the method described in U.S. PAT. NO. 3,887,433 (1975) of Robbins et al.

| Sample | Treatment | % Solids dsb | % Crude Protein dsb | % RNA dsb |
|---|---|---|---|---|
| MS-44-46 | Powder, microfluidized 18,000 psi, No incubation, heat to 80° C., washed | 96.5 | 65.0 | 7.0 |
| MS-45, 47, 48 | Powder, microfluidized 18,000 psi, incubation, 50° C. @ pH 6.0, heat to 80° C. washed | 96.2 | 64.2 | 9.3 |

In Table XII are recorded the viscosities of micron yeast pastes from various runs. With no incubation of a microfluidized yeast slurry at a solids of 6.6%, the yeast slurry had a viscosity of 2,340 cp. The viscosity of pastes with incubation varied from approximately 24,000 cp. to 107,640 cp. The high viscosity of over 100,000 cp was on a paste sample recovered with $CaCl_2$ addition. To one incubated microfluidized slurry, MS-48, was added 0.3% $CaCl_2$ based on the slurry solids before heating to 80° C. The solids was 11.7%. At 10% solids, the micron yeast pastes would all have a viscosity in the 20,000 to 100,000 cp range. All the pastes had a white color with no brown insolubles. All had a creamy mouth-feel.

The Brookfield viscosities of various batches of micron yeast pastes at 25° C. are given in Table VII. A Helipath Stand was used to measure viscosity with a Brookfield LVT. The viscosities of the pastes of this invention was determined by the same method used for glycan in U.S. Pat. No. 3,867,554.

TABLE XII

| Run # | Viscosities | % Solids | Process Treatment After Microfluidization |
|---|---|---|---|
| MS-45 | 27,300 | 10.4 | Incubation and heat to 80° C. |
| MS-47 | 2,340 | 6.6 | No incubation and no heat |
| MS-47 | 24,180 | 9.4 | Incubation and heat to 80° C. |
| MS-48 | 37,440 | 11.4 | Incubation and heat to 80° C. |
| MS-48 | 44,460 | 10.8 | Incubation and heat to 80° C. |
| MS-48 | 36,660 | 11.6 | Incubation and heat to 80° C. |
| MS-48 | 31,980 | 11.1 | Incubation and heat to 80° C. |
| MS-48 | 107,640 | 11.7 | Incubation and heat to 80° C. and $CaCl_2$ |

Pastes from Runs #45–47–48 were combined and diluted to approximately 5% solids and spray dried in a Nichols pilot spray dryer. The inlet temperature was 300° F. and the outlet temperature was 146° F. The recovered powder had the following composition.

|  | Micron Yeast #45, 47, 48 |
|---|---|
| Crude Protein | 64% dsb |
| Fat | 3.4% dsb |
| Ash | 4.6% dsb |
| Fiber | 0.3% dsb |
| Carbohydrate (by diff.) | 27.8% dsb |
| Nucleic Acid | 9.3% dsb |

These data demonstrate that a yeast product called micron yeast with a fatty mouth-feel can be produced having a high crude protein content and high nucleic acid content. The chemical composition of micron yeast is comparable to whole bakers yeast. Micron yeast solids are essentially microfluidized yeast insoluble solids separated from the yeast cells soluble solids. The micron yeast from bakers yeast slurries microfluidized at 18,000 psi, incubated, and heat-treated at 80° C., is similar in crude protein content to the micron yeast of Table VIII. The micron yeast of Table VIII was recovered without an incubation step of 1–2 hours at 50° C. and pH 6.0.

The microfluidized slurries of Example No. 5 were given multiple passes and held overnight before heat-treatment at 70° C. At no time did the microfluidized slurries reach temperatures above 55° C., which would inactivate the proteolytic enzymes in the slurry. During the prolonged holding time proteolytic activity was occurring, although at a slower rate than at the optimal temperature of 50° C. The pH of microfluidized yeast slurries are approximately 5.5. Optimal pH for optimal proteolytic activity is about 6.0.

The proteolytic activity during the holding period at temperatures below 55° C. resulted in the recovery by centrifugation of micron yeast paste without the incubation at pH 6.0 and 50° C. The slurries had to be heat-treated at 70° C. Similar proteolytic activity was observed in Example No. 6 when microfluidized yeast slurries at pH 9.5 dropped to pH of 5–6 on standing cold overnight.

Under most conditions of microfluidization of bakers yeast, the incubation of freshly microfluidized yeast slurries at 50° C. and pH 6.0 is the most practical process to produce high viscosity micron yeast from one pass through a microfluidizer.

As shown in Example No. 8, a yeast extract with flavor enhancing properties of brothy, mouth-watering, savory is recovered from the process of making micron yeast. From microfluidized yeast solids, 65% was recovered in a paste and 35% as an extract. The highest concentration of solids in the extract was in the first decant at approximately 4% solids. Membrane technology could be used to concentrate this low solids extract to a solids level practical for spray drying. Table XIII shows that the crude protein content of the extract on a dry solids basis can range from approximately 60 to 85%.

TABLE XIII

Following is the protein content of yeast extract, i.e., the yeast soluble solids recovered from bakers yeast microfluidized at 18,000 psi, incubated at 50° C. and pH 6.0, and heat-treated at 80° C. The extract is the first decant from the centrifuged slurry.

| Sample # | % Solids | % Crude Protein dsb |
|---|---|---|
| MS-48-29 | 3.9 | 59.0 |
| MS-48-37 | 4.0 | 85.0 |

The high water absorption of micron yeast is demonstrated by the high viscosity of the pastes at approximately 10% solids (Table XII). Spray drying the paste solids decreased the viscosity of the micron yeast solids on rehydration. A 10% solids slurry of micron yeast powder (MS-45–47–48) had a Brookfield viscosity of 1,560 cp. After holding the sample overnight in the refrigerator and mixing in a Waring blender for 5 minutes, the mouth-feel was very creamy.

In a second test a 15% solids slurry of micron yeast powder (MS-45–47–48) had a flow rate measured by a Bostwick Visometer of 8 centimeters in 15 seconds. Holding the slurry for 48 hours significantly increased the viscosity. Bostwick flow viscosity was 1.3 centimeters in 15 seconds.

Improved drying procedures would increase the rate of rehydration of the dried micron yeast. Co-drying with maltodextrin or powdered cellulose, mat drying, spray drying at high solids. etc., may produce powders which, on rehydration, may have viscosities comparable to the micron yeast pastes.

A blue cheese dressing was prepared with the formula in Table XIV. The prototype dressing had mouth-feel and emulsion properties similar to those found in typical pourable salad dressings.

TABLE XIV

| Ingredients | % |
| --- | --- |
| Water | 47.10 |
| White Vinegar | 20.00 |
| Bleu Cheese | 12.00 |
| 2.7 Skim Milk (solids basis) | 5.00 |
| Micron Yeast Powder #MS 45-47-48 | 4.00 |
| Sugar | 4.00 |
| Salt | 4.00 |
| Vegetable Oil | 3.00 |
| Mustard Powder | 0.50 |
| Onion Powder | 0.30 |
| Monosodium Glutamate | 0.10 |
| | 100.00 |

This invention is intended to cover a water insoluble yeast solids product which has a substantial portion, i.e., at least 75%, of yeast fragments of less than 3 microns, and preferably less than 1 micron, in size, with less than about 5% whole cells and less than about 10% ghost cells. The product has substantially the same nucleic acid content as the starting yeast biomass, usually about 5 to about 10%, and a crude protein content on a dry solids basis of about 55–80%. An aqueous suspension of the product has a minimum viscosity of about 20,000 centipoise at 10% solids. The product may have added $CaCl_2$ and can be recovered as a paste.

The process of this invention includes passing a bakers yeast biomass through a microfluidizer, preferably one pass at 12,000–22,000 psi, incubating the fragmented yeast cells at about 45°–55° C., pH of about 5.5–7.0 for about 60 to 120 minutes, heating the slurry to 70°–80° C., and recovering a high protein, high RNA matrix of fragmented yeast cells. The fragmented cells are less than about 3 microns in size, with less than about 5% whole cells and less than about 10% ghost cells. The recovered product has a viscosity of at least about 20,000 centipoise at 10% solids aqueous suspension. The preferred incubation conditions are about 50° C., pH about 6.0 for 90 minutes.

The production of a low RNA micron yeast with organoleptic properties similar to the micron yeast of this invention may be possible by additional processing steps. External sources of nuclease enzymes, such as from malt sprouts, may be added to the microfluidized yeast slurries, or the yeast can be subjected to alkaline hydrolysis. Such processing steps were used to make low RNA yeast protein isolates in U.S. Pat. No. 3,867,255 (Newell, Seeley and Robbins) and U.S. Pat. No. 3,867,555 (Newell, Robbins and Seeley).

Increasing the intensity of creamy mouth-feel of micron yeast on a solids basis may result from microfluidizing the yeast pastes of this invention. A sample of yeast paste from MS47 (Table X) was microfluidized at 18,000 psi. The insoluble yeast solids of the microfluidized yeast slurry did not separate on laboratory centrifugation. The second microfluidization may have produced colloidal fragments which would require additional processing to recover as an insoluble yeast solids paste.

This invention is not limited to Saccharomyces cerevisiae. Comparable micron yeast with creamy mouth-feel can be produced from any kind of edible yeast of the various genera of Saccharomyces, Candida and Kluyveromyces.

This invention is intended to cover all changes and modifications of the examples of the invention herein chosen for purposes of the disclosure which do not constitute departures from the spirit and scope of the invention.

What is claimed is:

1. A water insoluble yeast solids product made from an edible starting yeast biomass comprising more than about 75% yeast fragments less than 3 microns in size, less than about 5% whole cells, and less than about 10% ghost cells, said yeast product containing on a dry solids basis about 55–80% crude protein, substantially the same percent nucleic acid as the starting yeast biomass, and having a minimum viscosity of about 20,000 centipoise at 10% solids in aqueous suspension, said suspension having a fatty mouth-feel.

2. The product of claim 1 wherein more than about 80% of the fragments are less than 3 microns in size.

3. The product of claim 1 wherein the nucleic acid content is about 5 to about 10% dry solids basis.

4. The product of claim 1 in the form of an aqueous yeast paste.

5. A process for the production of a water insoluble yeast solids product comprising the steps of
   a) growing a food grade yeast biomass;
   b) harvesting and washing the yeast biomass,
   c) passing the yeast cells through a microfluidizer to form a yeast slurry and fragment the yeast cells such that more than about 75% of the cell fragments are less than about 3 microns in size,
   d) conditioning the slurry by incubating at about 45°–55° C. and pH of about 5.5 to 7.0 for about 60 to 120 minutes at solids concentrations of about 5–15%, and
   e) heating the slurry to about 70° C. to 80° C.,
   f) centrifuging the slurry, and
   h) recovering a yeast soluble portion and an insoluble yeast solids product having about 55–80% crude protein, less than about 10% ghost cells, less than about 5% whole cells, and substantially the same percent nucleic acid as the starting biomass as a yeast paste, the recovered yeast solids product having a minimum viscosity of about 200,000 centipoise at a 10% solids aqueous suspension and a fatty mouth-feel.

6. The process of claim 5 wherein recovered yeast paste has a solids content of about 6 to about 13% on a dry solids basis.

7. The process of claim 5 wherein the yeast biomass is passed only one time through the microfluidizer.

8. The process of claim 5 including the step of adding up to about 0.3% calcium chloride to the microfluidized yeast biomass before heating.

9. A process of claim 5 wherein the yeast solubles are recovered as a yeast extract when the insoluble yeast solids are recovered by centrifugation.

10. The process of claim 9 wherein about 56% to about 80% of the yeast solids are recovered as insolubles and about 20% to 44% of the solids are recovered as solubles.

11. The process of claim 9 wherein about 65% of the yeast solids are recovered as insolubles and about 35% of the solids are recovered as solubles.

12. The process of claim 9 wherein the solids recovered as solubles have a crude protein content of about 55% to about 85%.

13. A process of claim 5 including the step of drying the insoluble yeast solids paste to a powder of less than 10% moisture.

14. A process of claim 5 wherein the microfluidizer is run at a pressure of about 12,000 to about 20,000 psi.

15. A process for the production of a water insoluble yeast solids product comprising the steps of a) growing a food grade yeast biomass, b) harvesting and washing the yeast biomass, c) passing the yeast cells through a microfluidizer to form a microfluidized yeast slurry and fragment the yeast cells such that at least about 75% of the cell fragments are less than about 3 microns in size, d) conditioning the microfluidized yeast slurry at a temperature below 55° C. and pH below 9.5 for up to 12–24 hours, e) heating the slurry to 70° C.–80° C. for up to 5 minutes, and f) recovering the insoluble yeast solids product having about 55–80% crude protein, less than about 10% ghost cells, less than about 5% whole cells, and substantially the same percent nucleic acid as the starting biomass by centrifugation as a yeast paste, said yeast paste having a minimum viscosity of about 20,000 centipoise at 10% solids in aqueous suspension and having a fatty mouthfeel.

16. The product of claim 1 in the form of a powder having less than 10% moisture.

* * * * *

UNITED STATES PATENT AND TRADEMARK OFFICE
CERTIFICATE OF CORRECTION

PATENT NO : 5,756,135
DATED : May 26, 1998
INVENTOR(S) : Robert D. Seeley

It is certified that error appears in the above-identified patent and that said Letters Patent is hereby corrected as shown below:

Col. 7, line 57
  replace "200"
  with --20,000--.
Col. 18, line 55
  replace "200,000"
  with --20,000--.

Signed and Sealed this

Sixth Day of October, 1998

*Attest:*

BRUCE LEHMAN

*Attesting Officer*     Commissioner of Patents and Trademarks